US012460238B2

(12) United States Patent
Farmer et al.

(10) Patent No.: US 12,460,238 B2
(45) Date of Patent: Nov. 4, 2025

(54) METHODS OF PRODUCING COMPOSITIONS COMPRISING HYDROPHILIC SOPHOROLIPIDS

(71) Applicant: Locus Solutions IPCo, LLC, Solon, OH (US)

(72) Inventors: Sean Farmer, Ft. Lauderdale, FL (US); Ken Alibek, Solon, OH (US); Amir Mahmoudkhani, Solon, OH (US); Janaina Izabel Da Silva De Aguiar, Solon, OH (US)

(73) Assignee: Locus Solutions IPCo, LLC, Solon, OH (US)

( * ) Notice: Subject to any disclaimer, the term of this patent is extended or adjusted under 35 U.S.C. 154(b) by 176 days.

(21) Appl. No.: 17/769,951

(22) PCT Filed: May 20, 2021

(86) PCT No.: PCT/US2021/033352
§ 371 (c)(1),
(2) Date: Apr. 18, 2022

(87) PCT Pub. No.: WO2021/236904
PCT Pub. Date: Nov. 25, 2021

(65) Prior Publication Data
US 2023/0304060 A1 Sep. 28, 2023

Related U.S. Application Data

(60) Provisional application No. 63/027,676, filed on May 20, 2020.

(51) Int. Cl.
*C12P 19/44* (2006.01)

(52) U.S. Cl.
CPC .................................. *C12P 19/44* (2013.01)

(58) Field of Classification Search
CPC ....... C12P 19/44; C12P 7/6436; C12P 19/445; C09K 8/04; C09K 8/50; C09K 8/52;
(Continued)

(56) References Cited

U.S. PATENT DOCUMENTS 4,197,166 A * 4/1980 Inoue ...................... C07H 3/04
203/64
10,065,982 B2 9/2018 Hirata et al.
(Continued)

FOREIGN PATENT DOCUMENTS

CN 103555308 A 2/2014
CN 104178538 A 12/2014
(Continued)

OTHER PUBLICATIONS

Ciesielske, K., et al., "Exoproteome analysis of Starmerella bombicola results in the discovery of an esterase required for lactonization of sophorolipids." Journal of Proteomics, 98 (2014): 159-174.
(Continued)

*Primary Examiner* — Jiangtian Xu
(74) *Attorney, Agent, or Firm* — Benesch Friedlander Coplan & Aronoff LLP

(57) ABSTRACT

The subject invention provides materials and methods for producing high-HLB sophorolipid-based compositions and/or for increasing the water solubility of sophorolipid compositions. More specifically, the subject invention provides for the production and post-fermentation alteration of SLP molecules, which can be used for formulating a variety of useful compositions.

8 Claims, 11 Drawing Sheets

(58) Field of Classification Search
CPC ............ C09K 2208/20; C09K 2208/28; C09K 2208/32; C09K 8/584; C09K 8/62; C09K 23/56

See application file for complete search history.

(56) References Cited

U.S. PATENT DOCUMENTS

| | | |
|---|---|---|
| 2011/0237531 A1 | 9/2011 | Yanagisawa et al. |
| 2012/0311741 A1 | 12/2012 | Soetaert et al. |
| 2014/0194336 A1* | 7/2014 | Develter ............... C07H 15/04 510/471 |
| 2014/0273150 A1 | 9/2014 | Angel |
| 2014/0305649 A1 | 10/2014 | Tang et al. |
| 2015/0299556 A1 | 10/2015 | Gunawan et al. |
| 2015/0300139 A1 | 10/2015 | Armstrong et al. |
| 2016/0251565 A1 | 9/2016 | Yanagisawa et al. |
| 2016/0280733 A1 | 9/2016 | Araki et al. |
| 2016/0324747 A1 | 11/2016 | Ito et al. |
| 2017/0044586 A1 | 2/2017 | Duran |
| 2019/0359562 A1 | 11/2019 | Lyman et al. |
| 2020/0032128 A1 | 1/2020 | Farmer et al. |

FOREIGN PATENT DOCUMENTS

| | | | |
|---|---|---|---|
| CN | 105567580 A | 5/2016 | |
| CN | 105886572 A | 8/2016 | |
| CN | 105999763 A | 10/2016 | |
| CN | 109678914 A | 4/2019 | |
| EP | 3034613 A1 | 6/2016 | |
| JP | 2003009896 A | 1/2003 | |
| JP | 2010200695 A | 9/2010 | |
| JP | 2014150774 A | 8/2014 | |
| JP | 2014185106 A | 10/2014 | |
| JP | 2015119698 A | 7/2015 | |
| JP | 2016000017 A | 1/2016 | |
| KR | 20180057235 A | 5/2018 | |
| KR | 20190123588 A | 11/2019 | |
| WO | 2012168325 A1 | 12/2012 | |
| WO | WO-2012167813 A1 * | 12/2012 | ............... C12P 19/12 |
| WO | 2013003291 A2 | 1/2013 | |
| WO | 2013092421 A1 | 6/2013 | |
| WO | 2015153476 A1 | 10/2015 | |
| WO | 2015164327 A1 | 10/2015 | |
| WO | 2017044953 A1 | 3/2017 | |
| WO | 2018049182 A2 | 3/2018 | |
| WO | 2018107162 A1 | 6/2018 | |
| WO | 2018129299 A1 | 7/2018 | |
| WO | 2018148265 A2 | 8/2018 | |
| WO | 2018237137 A1 | 12/2018 | |
| WO | 2019067356 A1 | 4/2019 | |
| WO | 2019094615 A1 | 5/2019 | |
| WO | 2019191296 A1 | 10/2019 | |
| WO | 2019213055 A1 | 11/2019 | |
| WO | 2020006194 A1 | 1/2020 | |
| WO | 2020028253 A1 | 2/2020 | |
| WO | 2020041258 A1 | 2/2020 | |
| WO | 2020069177 A1 | 4/2020 | |

OTHER PUBLICATIONS

Daverey, A., et al., "Production of sophorolipids by the yeast Candida bombicola using simple and low cost fermentative media." Food Research International, 42.4 (2009): 499-504.

De Oliveira, M. R., et al., "Review: Sophorolipids A Promising Biosurfactant and it's Applications." International Journal of Advanced Biotechnology and Research, 6.2 (2015): 161-174.

De Almeida, D. G., et al., "Biosurfactants: Promising Molecules for Petroleum Biotechnology Advances." Frontiers in Microbiology, 7 (2016): 1718, pp. 1-14.

Dolman, B. M., et al., "Integrated sophorolipid production and gravity separation." Process Biochemistry, 54 (2017): 162-171.

Dolman, B. M., et al., "Integrated production and separation of biosurfactants." Process Biochemistry, 83 (2019): 1-8.

Elshafie, A. E., et al., "Sophorolipids Production by Candida bombicola ATCC 22214 and its Potential Application in Microbial Enhanced Oil Recovery." Frontiers in Microbiology, 6 (2015): 1324, pp. 1-11.

Hu, Y., et al., "Purification of lactonic sophorolipids by crystallization." Journal of Biotechnology, 87.3 (2001): 263-272.

Jahan, R., et al., "Biosurfactants, natural alternatives to synthetic surfactants: Physiochemical properties and applications." Advances in Colloid and Interface Science, 275 (2020): 102061, pp. 1-22.

Kim, H., et al., "Sophorolipid Production by Candida bombicola ATCC 22214 from a Corn-Oil Processing Byproduct." Journal of Microbiology and Biotechnology 15.1 (2005): 55-58.

Konishi, M., et al., "Selective Production of Acid-form Sophorolipids from Glycerol by Candida floricola." Journal of Oleo Science, 66.12 (2017): 1365-1373.

Konishi, M., et al., "Efficient Production of Acid-Form Sophorolipids from Waste Glycerol and Fatty Acid Methyl Esters by Candida floricola." Journal of Oleo Science, 67.4 (2018): 489-496.

Kurtzman, C. P., et al., "Production of sophorolipid biosurfactants by multiple species of the Starmella (Candida) bombicola yeast clade." FEMS Microbiology Letters, 311.2 (2010): 140-146.

Lin, Y., et al., "Rational high-throughput screening system for high sophorolipids production in Candida bombicola by co-utilizing glycerol and glucose capacity." Bioresources and Bioprocessing, 6.17 (2019): 1-9.

Madankar, C. S., et al., "Review on sophorolipids—a promising microbial bio-surfactant." Tenside Surfactants Detergents, 60.2 (2023): 95-105.

Ma, X., et al., "Surface and biological activity of sophorolipid molecules produced by Wickerhamiella domercqiae var. sophorolipid CGMCC 1575." Journal of Colloid and Interface Science, 376.1 (2012): 165-172.

Pacwa-Plociniczak, M., et al., "Environmental Applications of Biosurfactants: Recent Advances." International Journal of Molecular Sciences, 12.1 (2011): 633-654.

Rispoli, F. J., et al., "Optimization of the Fermentation Media for Sophorolipid Production from Candida bombicola ATCC 22214 Using a Simplex Centroid Design." Biotechnology Progress, 26.4 (2010): 938-944.

Shah, M. U. H., et al., "Production of sophorolipids by Starmella bombicola yeast using new hydrophobic substrates." Biochemical Engineering Journal, 127 (2017): 60-67.

Silva, R. D.C. F. S., et al., "Applications of Biosurfactants in the Petroleum Industry and the Remediation of Oil Spills." International Journal of Molecular Sciences, 15.7 (2014): 12523-12542.

Sivagiri, S. D., et al., "Improved synthesis of sophorolipid biosurfactants using industrial by-products and their practical application." Tenside Surfactants Detergents, 59.1 (2022): 17-30.

Takahashi, M., et al., "Production of Sophorolipid Glycolipid Biosurfactants from Sugarcane Molasses Using Starmerella bombicola NBRC 10243." Journal of Oleo Science, 60.5 (2011): 267-273.

Van Bogaert, I. N. A., et al., "Microbial production and application of sophorolipids." Applied Microbiology and Biotechnology, 76 (2007): 23-34.

Vedaraman, N., et al., "The effect of medium composition on the production of sophorolipids and the tensiometric properties by Starmerella bombicola MTCC 1910." Polish Journal of Chemical Technology, 12.2 (2010): 9-13.

Wadekar, S. D., et al., "Utilization of Sweetwater as a Cost-Effective Carbon Source for Sophorolipids Production by Starmerella bombicola (ATCC 22214)." Biochemistry and Biotechnology, 42.2 (2012): 125-142.

Wadekar, S., et al., "Sophorolipid Production by Starmerella bombicola (ATCC 22214) from Virgin and Waste Frying Oils, and the Effects of Activated Earth Treatment of the Waste Oils." Journal of the American Oil Chemists' Society, 89.6 (2012): 1029-1039.

Baccile, N., et al. "Practical methods to reduce impurities for gram-scale amounts of acidic sophorolipid biosurfactants." European Journal of Lipid Science and Technology 115.12 (2013): 1404-1412.

(56) References Cited

OTHER PUBLICATIONS

Koganti, S. "Conversion of biodiesel byproduct glycerol to arabitol and sophorolipids through microbial fermentation". The University of Akron, 2012: pp. 1-205.

* cited by examiner

Harvesting a Crude Form Hydrophobic SLP Fraction

Note: volumes and layers are not drawn to actual scale.

Fermentation Reactor or First Collection Container

Supernatant (crude hydrophilic SLP fraction) comprising:
- dissolved hydrophilic SLP
- yeast cells
- glucose
- fatty acids
- broth components

Settled hydrophobic SLP fraction (crude form)

→ harvest →

Second Collection Container

Crude Form Hydrophobic SLP fraction

↑ 10 to 50 hr without disturbance

Fermentation Reactor

Yeast Fermentation Product comprising:
- hydrophilic SLP
- hydrophobic SLP
- yeast cells
- broth components
- glucose
- fatty acids End of Fermentation Cycle

FIG. 3A

METHODS OF PRODUCING COMPOSITIONS COMPRISING HYDROPHILIC SOPHOROLIPIDS

This application is a National Stage Application of International Application No. PCT/US2021/033352, filed May 20, 2021; which claims priority to U.S. Provisional Patent Application No. 63/027,676, filed May 20, 2020, both of which are incorporated herein by reference in their entirety.

BACKGROUND OF THE INVENTION

The demand for sustainable and environmentally-friendly technologies to improve industrial and consumer-base products is rapidly growing. The oil and gas industry, for example, uses substantial amounts of chemicals, such as petrochemical-based synthetic surfactants, in these processes to, for example, mobilize hydrocarbons from formations, treat contaminated or clogged oil wells, and improve transportation of hydrocarbons.

Surfactants are surface-active, amphiphilic molecules with potential applications in nearly all areas of industry in addition to the oil and gas industry. The properties of a surface-active molecule can be measured by hydrophile-lipophile balance (HLB). HLB is the balance of the size and strength of the hydrophilic and lipophilic moieties of a surface-active molecule. Specific HLB values are required to, for example, form a stable emulsion. In water/oil and oil/water emulsions, the polar moiety of the surface-active molecule orients towards the water, and the non-polar group orients towards the oil, thus lowering the interfacial tension between the oil and water phases.

HLB values range from 0 to about 20, with lower HLB (e.g., 10 or less) being more oil-soluble and suitable for water-in-oil emulsions, and higher HLB (e.g., 10 or more) being more water-soluble and suitable for oil-in-water emulsions. Other properties, such as foaming, wetting, detergency and solubilizing capabilities, are also dependent upon HLB.

Synthetic and chemical surfactants are advantageous because they can be easy to produce and can be tailored to perform a desired function based on their molecular structure; however, the effects of over-use and over-production of some chemical surfactants on the environment and on human health are known to be unfavorable, or in some instances, are yet unknown.

Attempts have been made to create biologically-based surface-active molecules that are biodegradable and have low toxicity, but they are more difficult to modify in order to produce products having specific physical and chemical characteristics. One specific group of biological surface-active molecules includes those produced by microorganisms, or biosurfactants. Biosurfactants are a structurally diverse group of surface-active substances consisting of two parts: a polar (hydrophilic) moiety and non-polar (hydrophobic) group.

Due to their amphiphilic structure, biosurfactants can, for example, increase the surface area of hydrophobic water-insoluble substances, increase the water bioavailability of such substances, and change the properties of bacterial cell surfaces. Biosurfactants can also reduce the interfacial tension between water and oil and, therefore, lower the hydrostatic pressure required to move entrapped liquid to overcome the capillary effect. Biosurfactants accumulate at interfaces, thus reducing interfacial tension and leading to the formation of aggregated micellar structures in solution. The formation of micelles provides a physical mechanism to mobilize, for example, oil in a moving aqueous phase. The ability of biosurfactants to form pores and destabilize biological membranes also permits their use as antibacterial, antifungal, and hemolytic agents to, for example, control pests and/or microbial growth.

There are multiple types of biosurfactants, including low molecular weight glycolipids, lipopeptides, flavolipids and phospholipids, and high molecular weight polymers such as lipoproteins, lipopolysaccharide-protein complexes, and polysaccharide-protein-fatty acid complexes.

Typically, the hydrophilic group of a biosurfactant is a sugar (e.g., a mono-, di-, or polysaccharide) or a peptide, while the hydrophobic group is typically a fatty acid. There are countless potential variations of biosurfactant molecules based on, for example, type of sugar, number of sugars, size of peptides, which amino acids are present in the peptides, fatty acid length, saturation of fatty acids, additional acetylation, additional functional groups, esterification, polarity and charge of the molecule.

Glycolipids, in particular, are biosurfactants comprising a carbohydrate and at least one fatty acid. Glycolipids include, for example, rhamnolipids (RLP), rhamnose-d-phospholipids, trehalose lipids, trehalose dimycolates, trehalose monomycolates, mannosylerythritol lipids (MEL), cellobiose lipids, ustilagic acids and/or sophorolipids (SLP).

Sophorolipids are glycolipid biosurfactants produced by, for example, various yeasts of the *Starmerella* clade. SLP consist of a disaccharide sophorose linked to long chain hydroxy fatty acids. They can comprise a partially acetylated 2-O-β-D-glucopyranosyl-D-glucopyranose unit attached β-glycosidically to 17-L-hydroxyoctadecanoic or 17-L-hydroxy-Δ9-octadecenoic acid. The hydroxy fatty acid is generally 16 or 18 carbon atoms, and may contain one or more unsaturated bonds. Furthermore, the sophorose residue can be acetylated on the 6- and/or 6'-position(s). The fatty acid carboxyl group can be free (acidic or linear) or internally esterified at the 4''-position (lactonic). Additionally, *S. bombicola* produces a specific enzyme, called *S. bombicola* lactone esterase, which catalyzes the esterification of linear SLP to produce lactonic SLP.

Lactonic and acidic sophorolipids have different functional properties. For example, acidic SLP have higher HLB and lower critical micelle concentration (CMC) than lactonic SLP, while lactonic SLP have lower HLB and greater surface tension reducing properties than acidic SLP. Additionally, acidic SLP are highly water soluble due to their free carboxylic acid groups.

In addition to these forms, there exist a number of derivatives characterized by the presence or absence of double bonds in the fatty acid side chain, the length of the carbon chain, the position of the glycosidic ether bond, the presence or absence of acetyl groups introduced to the hydroxyl groups of the sugar moiety, and other structural parameters.

Thus, depending upon the application, certain structural SLP variants will perform better than others. In particular, acetylation of SLP is an important structural variation because of its influence on, for example, water solubility, foaming properties, and biological activity. However, obtaining a desired degree of acetylation from conventional cultivation methods by altering fermentation parameters is challenging without, for example, the use of genetically-modified yeasts.

SLP can be used in, for example, food preservation, biomedicine, cosmetics, bioremediation, remediation of heavy metals, and making various household cleaning products. SLP can also be applicable to the petroleum industry in, for example, drilling, cement slurries, fracturing, enhanced oil recovery, scale formation prevention, acidization, demulsification of crude fluids, corrosion inhibition, reduced oil viscosity, cleaning of equipment, waterflooding, and/or foam and steam flooding. Furthermore, in agriculture and livestock production, SLP can be used as, for example, soil amendments, broad spectrum biopesticides, antiviral, antifungal and antibacterial agents, and/or additives to animal feed to enhance nutrient absorption.

The characteristics and chemical interactions of hydrophilic SLP molecules, such as non-acetylated linear SLP, differ from hydrophobic SLP, such as lactonic SLP and mono- and di-acetylated linear SLP, meaning each group of SLP could be used for many individualized uses. Due to the biological nature of SLP production, however, it is challenging to obtain SLP compositions with the specific functional properties required for a particular use. The mixture of hydrophobic and hydrophilic SLP produced by *Starmerella bombicola*, for example, comprises mostly hydrophobic SLP (e.g., about 70%). Thus, hydrophilic SLP having a high HLB value can be particularly challenging to produce. Accordingly, improved methods are needed for producing high-HLB hydrophilic SLP compositions with increased water solubility.

BRIEF SUMMARY OF THE INVENTION

The subject invention provides materials and methods for producing compositions, such as oil and gas industry service fluids ("service fluids"), comprising hydrophilic sophorolipid (SLP) molecules, wherein the compositions have high hydrophile-lipophile balance (HLB) values, for example, as high as 18 to 20.

In certain embodiments, the methods provide for post-fermentation functionalization of SLP molecules, which can be used for formulating a variety of products, such as service fluids.

In certain embodiments, the subject invention provides methods for post-fermentation alteration of the ratio of hydrophilic SLP to hydrophobic SLP molecules in a mixture of SLP molecules produced by a yeast culture. Preferably, the methods are used to produce SLP compositions with increased ratios of hydrophilic to hydrophobic SLP, compared with what is produced naturally during fermentation.

In preferred embodiments, methods are provided for producing a high-HLB SLP composition, the methods comprising: obtaining a yeast fermentation product, said yeast fermentation product comprising one or more SLP molecules; functionalizing the SLP molecule(s); and, optionally, mixing the functionalized SLP molecule(s) with a liquid, with other SLP molecules, and/or with additional components specific to the type of product being produced.

In certain specific embodiments, the methods comprise: obtaining a yeast fermentation product, said yeast fermentation product comprising a mixture of hydrophilic and hydrophobic SLP molecules; separating hydrophobic SLP molecules from the hydrophilic SLP molecules; and functionalizing the separated hydrophobic SLP molecules by converting all, or a majority, of the hydrophobic SLP molecules into hydrophilic SLP molecules.

In certain embodiments, the converted hydrophobic (now hydrophilic) SLP molecules are recombined with the original hydrophilic SLP molecules of the yeast fermentation product, thus producing a SLP composition with an increased ratio of hydrophilic SLP molecules compared with what was produced in the yeast fermentation product.

In one embodiment, the yeast fermentation product comprises one or more SLP molecules produced by cultivating a SLP-producing yeast. In preferred embodiments, the SLP-producing yeast is *Starmerella bombicola*, or another member of the *Starmerella* and/or *Candida* clades. For example, *S. bombicola* strain ATCC 22214 can be used according to the subject methods.

In one embodiment, the SLP molecule is an acidic, or linear, SLP (ASL). In one embodiment, the SLP molecule is a lactonic SLP (LSL). In one embodiment, the SLP molecule is a de-acetylated or un-acetylated SLP, mono-acetylated SLP, di-acetylated SLP, esterified SLP, a SLP with varying hydrophobic chain lengths (e.g., derived from stearic acid, linoleic acid, and/or oleic acid), a SLP with fatty acid-amino acid complex attached, and/or other SLP molecules, as are described elsewhere in this disclosure.

In certain embodiments, the yeast fermentation product can be allowed to sit undisturbed after the fermentation cycle is complete until a layer substantially comprising hydrophobic SLP molecules settles at the bottom. This layer, when harvested from the yeast fermentation product, comprises a crude form yeast fermentation fraction, according to one embodiment, comprising LSL and small amounts of mono- and/or di-acetylated ASL, as well as residual fermentation broth, glucose, fatty acids, and/or yeast cells.

If desired, this crude form hydrophobic SLP fraction can be further treated to remove the broth, glucose, fatty acids, and/or yeast cells, and, optionally, subjected to further purification, for example, to a purity of at least 80%, or at least 90% hydrophobic SLP, to produce a purified hydrophobic SLP fraction. In some embodiments, purification is achieved via water washing and/or oil washing, as described in embodiments below.

In certain embodiments, the method comprises functionalizing a SLP molecule to create characteristics appropriate for the application for which it will be used. In certain embodiments, "functionalizing" means altering the functional properties of the SLP molecule. Functionalization of the SLP molecule is preferably not performed during fermentation by, for example, altering the parameters of fermentation and/or using a genetically-modified microorganism, but rather is performed post-fermentation.

Functionalization can be performed by, for example, modifying the molecular structure of a SLP molecule. In some embodiments, the functional property that is altered is, for example, HLB, solubility, foaming, detergency, emulsification, demulsification, and/or wettability altering capabilities.

In certain preferred embodiments, the SLP molecule's HLB and/or water solubility is altered. In some embodiments, the method comprises subjecting the SLP molecule to alkaline hydrolysis in order to increase the HLB and/or water solubility. For example, in one embodiment, a hydrophobic SLP fraction can be mixed with a base, such as, e.g., sodium hydroxide, potassium hydroxide, and/or ammonium hydroxide, to adjust the pH to, e.g., about 4 to about 10, preferably about 6.5 to 10. In certain embodiments, this is achieved by titrating small amounts (e.g., 0.01 ml/L to 25 ml/L, or 0.1 ml/L to 5 ml/L) of the base into the fraction at a controlled temperature (e.g., not greater than 60° C.). Upon reaching the desired pH, the mixture is mixed for approximately 20 to 30 minutes.

In some embodiments, the increased pH results in conversion of LSL molecules to more water-soluble ASL molecules via alkali-mediated hydrolysis of the lactone ring. Thus, the chemical composition of the fraction is shifted towards a prevalence of ASL over LSL, for example, greater than 50% ASL, or about 51-99% ASL, or a ratio of 51:49, 55:45, 60:40, 65:35, 70:30, 75:25, 80:20, 85:15, 90:10, or 95:5, ASL to LSL.

In another embodiment, the increased pH results in alkali-mediated de-acetylation of a mono- or di-acetylated ASL or LSL molecule, thereby lowering the degree of acetylation and increasing the water solubility of the molecule(s).

In some embodiments, an ASL molecule can be mixed with an organic amine, e.g., ethanolamine, triethanolamine, propylamine, and/or isopropylamine, resulting in deprotonation of the carboxyl group of the ASL molecule's fatty acid chain, thus increasing the water solubility of the molecule.

In certain embodiments, the method can further comprise stabilizing the converted SLP fraction to prevent degradation by long-term exposure to high pH and/or temperature. For example, in some embodiments this can be achieved by adding an acid to the mixture to arrive at a pH of about 6.5 to 7.5, or about 7.0 to 7.2.

In one embodiment, the method can comprise mixing the fraction comprising the functionalized SLP molecules with other components, such as water or another liquid carrier, and/or other SLP fractions and/or molecules, depending upon the desired use(s) for the composition.

In one embodiment, the method can comprise mixing the functionalized SLP molecules with water or another liquid, such as salt water, brine, produced water, and/or a non-aqueous fluid, such as methanol or ethylene glycol, to create a service fluid. Depending upon the type of service fluid and its use(s), additional components can also be mixed with the SLP molecule and the liquid, for example, polymers, viscosifying agents, deflocculants, lubricants, fluid loss additives, friction reducers, solvents, pH adjusters, biocides, sulfide scavengers, microorganisms, chelating agents, surfactants, and/or other additives.

Exemplary service fluid compositions according to the subject invention include, but are not limited to, water-based drilling fluids, water-in-oil demulsifiers, sludge removal treatments, crude oil viscosity reducers, corrosion inhibitors, reservoir wettability modifiers, water flooding injection fluids, polymer flooding fluids, fracturing fluids, matrix stimulation fluids, hydrocarbon-based treatment fluids, paraffin and/or asphaltene removers and/or dispersants, workover fluids, packer fluids, completion fluids, diverter fluids and/or oil displacement fluids.

In certain embodiments, the subject invention provides useful compositions comprising one or more hydrophilic SLP molecules. In preferred embodiments, the composition has an HLB greater than 16, more preferably, 18 to 20 or greater. In other preferred embodiments, the composition comprises hydrophilic SLP molecules and hydrophobic SLP molecules, wherein the ratio of hydrophilic SLP molecules to hydrophobic SLP molecules is, for example, about 60:40 to 70:30.

In some embodiments, the compositions can comprise additional components such as, for example, polymers, viscosifying agents, deflocculants, lubricants, fluid loss additives, friction reducers, essential oils, solvents, pH adjusters, essential oils, biocides, sulfide scavengers, microorganisms, chelating agents, non-biological surfactants, builders and/or other additives. The compositions can be useful as, for example, cleaning products, detergents, oil-in-water emulsifiers, corrosion inhibitors, foaming agents, and many other uses.

Advantageously, the subject invention helps improve the efficiency of producing SLP-based compositions having specific functions, without the need for altering the parameters of fermentation or, in some embodiments, without the need for using genetically-modified SLP-producing microorganisms.

Thus, in some embodiments, crude form or purified form SLP can be provided in bulk to a user, who can then collect and functionalize the SLP as needed, based on the desired application. Alternatively, a user can place an order for specific functionalized SLP from a facility that produces the crude and/or purified form SLP, and the functionalized product can be readily produced and transported to the user by the production facility.

Advantageously, the methods and compositions of the subject invention reduce the cost and environmental impacts typically caused by production and use of surfactants by reducing and/or eliminating the need for chemical surfactants.

BRIEF DESCRIPTION OF THE FIGURES

FIGS. 2A-2C show three ASL molecules having a C18:1 chain. Squares denote the un-bonded ester group that distinguishes ASL molecules from LSL molecules. Shaded circles denote protonation of the sophorose at either the 6 or 6' position. Unshaded circles denote acetyl groups. 2A shows a di-acetylated ASL. 2B shows a mono-acetylated ASL with the acetyl group located at the 6-position of the sophorose. 2C shows a mono-acetylated ASL with the acetyl group located at the 6'-position of the sophorose.

FIGS. 3A-3B show schematics of (3A) harvesting a crude form hydrophobic SLP fraction produced according to an embodiment of the subject methods and (3B) purifying the hydrophobic SLP fraction via water-washing.

DETAILED DESCRIPTION OF THE INVENTION

Figure 1C:
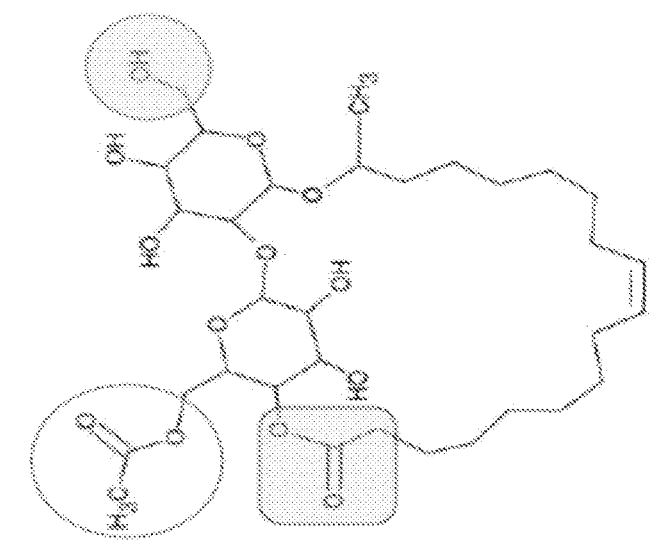
FIGS. 1A-1C show three LSL molecules having a C18:1 chain. Squares denote the ester bond that distinguishes LSL molecules from ASL molecules. Shaded circles denote protonation of the sophorose at either the 6 or 6' position. Unshaded circles denote acetyl groups. 1A shows a di-acetylated LSL. 1B shows a mono-acetylated LSL with the acetyl group located at the 6-position of the sophorose. 1C shows a mono-acetylated LSL with the acetyl group located at the 6'-position of the sophorose.

The subject invention provides materials and methods for producing compositions comprising hydrophilic sophorolipid (SLP) molecules, wherein the compositions have high hydrophile-lipophile balance (HLB) values, for example, as high as 18 to 20. More specifically, the subject invention provides for the production and post-fermentation functionalization of SLP molecules, which can be used for formulating a variety of products, e.g., service fluids. In some embodiments, the water solubility of the SLP molecules is increased.

In certain embodiments, the methods provide for post-fermentation alteration of the ratio of hydrophilic SLP to hydrophobic SLP molecules in a mixture of SLP molecules produced by a yeast culture. Preferably, the methods increase the ratio of hydrophilic to hydrophobic SLP.

In preferred embodiments, methods are provided for producing a high-HLB SLP composition, the methods comprising: obtaining a yeast fermentation product, said yeast fermentation product comprising a mixture of hydrophilic and hydrophobic SLP molecules; separating hydrophilic SLP molecules from hydrophobic SLP molecules by creating a fraction that is rich in hydrophobic SLP molecules and second fraction that is rich in hydrophilic SLP molecules; and converting all, or a majority, of the hydrophobic SLP molecules in the hydrophobic fraction into hydrophilic SLP molecules.

Selected Definitions

As used herein, the term "sophorolipid," "sophorolipid molecule," "SLP" or "SLP molecule" includes all forms, and isomers thereof, of SLP molecules, including, for example, acidic, or linear, SLP (ASL) and lactonic SLP (LSL). Further included are un-acetylated (or de-acetylated) SLP, mono-acetylated SLP, di-acetylated SLP, esterified SLP, SLP with varying hydrophobic chain lengths (e.g., derived from stearic, linoleic and/or oleic acid), SLP with fatty acid-amino acid complexes attached, and others as are described within in this disclosure.

As used herein, reference to a "yeast fermentation product" means a composition that comprises components that were produced as the result of the growth of yeasts or other cell cultures. Thus, the yeast fermentation product may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed. The microbes may be present in, or removed from, the composition. The cells may be present at, for example, a concentration of at least $1\times10^4$, $1\times10^5$, $1\times10^6$, $1\times10^7$, $1\times10^8$, $1\times10^9$, $1\times10^{10}$, $1\times10^{11}$, $1\times10^{12}$, or more CFU per milliliter of the composition.

As used herein, a "biofilm" is a complex aggregate of microorganisms, such as bacteria, wherein the cells adhere to each other and/or to a surface using an extracellular polysaccharide matrix. The cells in biofilms are physiologically distinct from planktonic cells of the same organism, which are single cells that can float or swim in liquid medium.

As used herein, an "isolated" or "purified" compound such as a small molecule (e.g., those described below), is substantially free of other compounds, such as cellular material, with which it is associated in nature and/or in which it was cultivated. An isolated microbial strain means that the strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight the compound of interest. Preferably, the preparation is at least 75%, more preferably at least 90%, and most preferably at least 98%, by weight the compound of interest. For example, a purified compound is one that is at least 80%, 85%, 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein a "reduction" means a negative alteration, and an "increase" means a positive alteration, wherein the negative or positive alteration is at least 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

As used herein, "surfactant" means a compound that lowers the surface tension (or interfacial tension) between two liquids or between a liquid and a solid. Surfactants act as, e.g., detergents, wetting agents, emulsifiers, foaming agents, and/or dispersants. A "biosurfactant" is a surface-active substance produced by a living cell or synthesized using naturally-derived ingredients.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Methods

The subject invention provides materials and methods for producing industrial and/or consumer-based products such as, e.g., oil and gas industry service fluids ("service fluids"). More specifically, the subject invention provides for the production and post-fermentation functionalization of SLP molecules, which can be used for formulating a variety of products.

In certain embodiments, the subject invention provides methods for post-fermentation alteration of the ratio of hydrophilic SLP to hydrophobic SLP molecules in a mixture of SLP molecules produced by a yeast culture. Preferably, the methods are used to produce SLP compositions with increased ratios of hydrophilic to hydrophobic SLP, compared with what is produced naturally during fermentation. Furthermore, in certain embodiments, the methods are used to produce SLP compositions having increased water solubility compared with what is produced naturally during fermentation.

In preferred embodiments, methods are provided for producing a high-HLB SLP composition, the methods comprising: obtaining a yeast fermentation product, said yeast fermentation product comprising one or more SLP molecules; functionalizing the SLP molecule(s); and, optionally, mixing the functionalized SLP molecule(s) with a liquid, with other SLP molecules, and/or with additional components specific to the type of product being produced.

In certain specific embodiments, the methods comprise: obtaining a yeast fermentation product, said yeast fermentation product comprising a mixture of hydrophilic and hydrophobic SLP molecules; separating hydrophobic SLP molecules from the hydrophilic SLP molecules; and functionalizing the separated hydrophobic SLP molecules by converting all, or a majority, of the hydrophobic SLP molecules into hydrophilic SLP molecules.

In certain embodiments, the methods are used to increase the amount of hydrophilic SLP molecules within a SLP-containing composition collected from a yeast fermentation product so that the composition comprises a greater ratio of hydrophilic SLP to hydrophobic SLP. For example, in certain embodiments, the ratio of hydrophilic SLP to hydrophobic SLP can be adjusted to about 60:40, 65:35, 70:30, or 75:25.

In one embodiment, the yeast fermentation product comprises one or more SLP molecules harvested from a culture produced by cultivating a SLP-producing yeast.

In certain embodiments, the SLP molecule according to the subject invention are represented by General Formula (1) and/or General Formula (2), and include 30 or more structural homologues having, for example, different fatty acid chain lengths ($R^3$), and, in some instances, having an acetylation or protonation at $R^1$ and/or $R^2$.

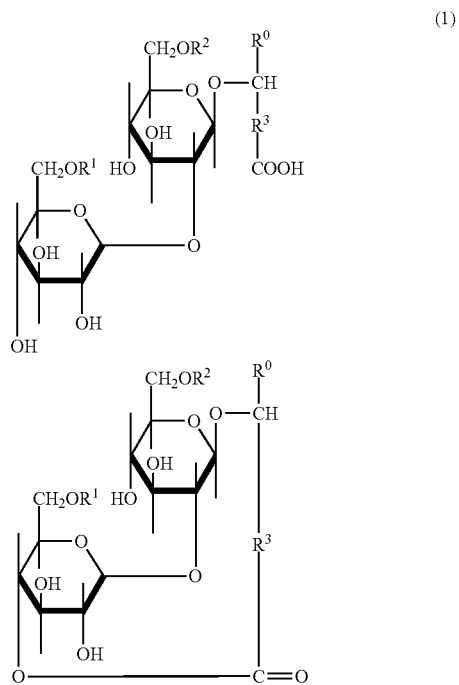

In General Formula (1) or (2), $R^0$ can be either a hydrogen atom or a methyl group. $R^1$ and $R^2$ are each independently a hydrogen atom or an acetyl group. $R^3$ is a saturated or unsaturated hydrocarbon chain that may have one or more Substituents.

Examples of the Substituents include halogen atoms, hydroxyl groups, lower (C1-6) alkyl groups, halo lower (C1-6) alkyl groups, hydroxy lower (C1-6) alkyl groups, halo lower (C1-6) alkoxy groups, and the like. $R^3$ typically has 11 to 20 carbon atoms, preferably 13 to 17 carbon atoms, and more preferably 14 to 16 carbon atoms.

Due to the structure and composition of SLP, these biosurfactants have excellent surface and interfacial tension reduction properties, as well as other beneficial biochemical properties, which can be useful in various products, such as, for example, cleaning products, corrosion inhibitors, oil-in-water emulsifiers, oil and gas industry service fluids, and foaming enhancers.

Figure 1B:
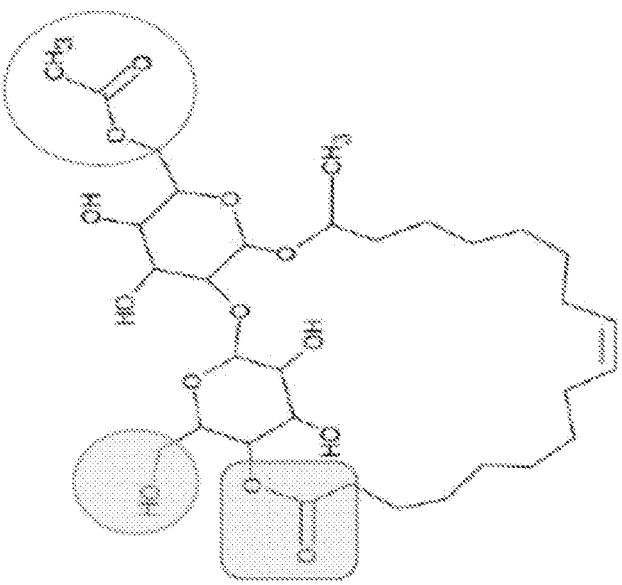
Figure 1A:
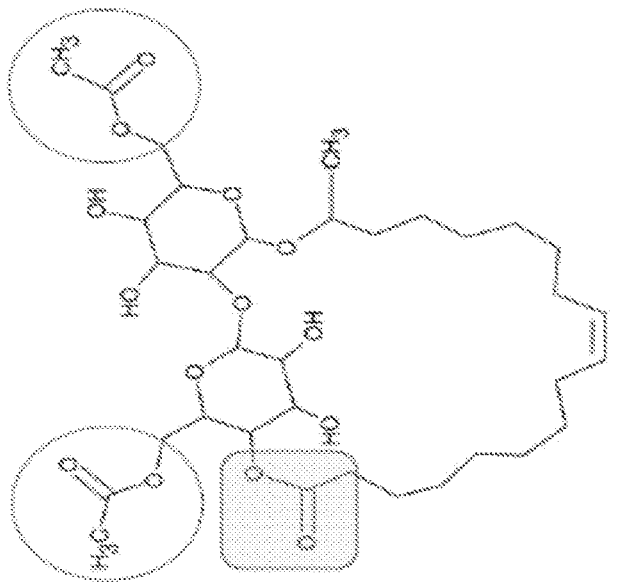
Figures 2B, 2C:
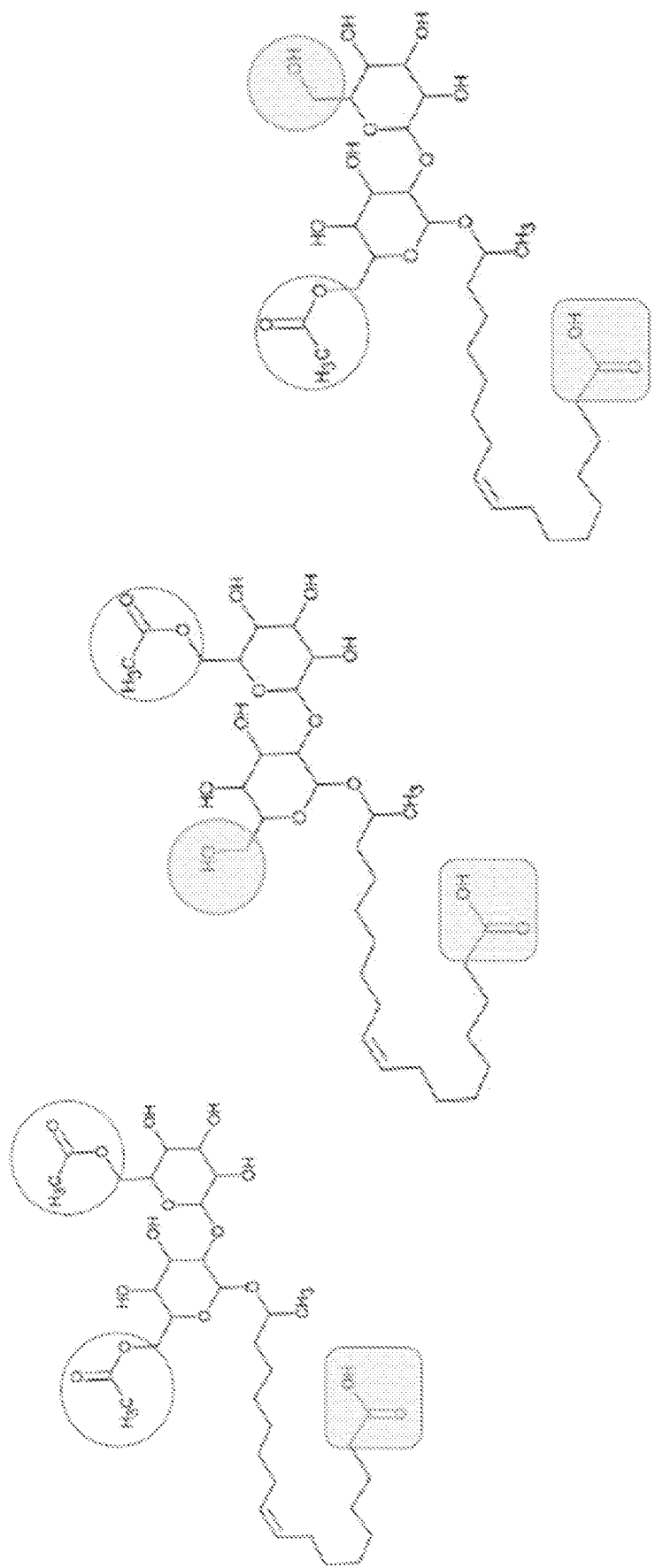

In one embodiment, the SLP molecule is an acidic, or linear, SLP (ASL). In one embodiment, the SLP molecule is a lactonic SLP (LSL). In one embodiment, the SLP molecule is an un-acetylated SLP, mono-acetylated SLP, di-acetylated SLP, esterified SLP, a SLP with varying hydrophobic chain lengths (e.g., derived from linoleic acid, stearic acid, and/or oleic acid), a SLP with fatty acid-amino acid complexes attached, and/or another form according to General Formulas (1) and/or (2). See also, FIGS. 1-2.

In preferred embodiments, the yeast fermentation product is obtained by cultivation of a SLP-producing microorganism. The SLP-producing microorganism may be natural, or genetically modified microorganisms. In preferred embodiments, however, no genetically-modified organisms are required.

In preferred embodiments, the microorganism is a yeast or fungus. Examples of yeast and fungus species suitable for use according to the current invention, include, but are not limited to, *Acaulospora, Aspergillus, Aureobasidium* (e.g., *A. pullulans*), *Blakeslea, Candida* (e.g., *C. albicans, C.*

*apicola*), *Cryptococcus, Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Meyerozyma* (e.g., *M. guilliermondii*), *Penicillium, Phythium, Phycomyces, Pichia* (e.g., *P. anomala, P. guilliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Williopsis*, and *Zygosaccharomyces* (e.g., *Z. bailii*).

In preferred embodiments, microorganism is a *Starmerella* spp. yeast and/or *Candida* spp. yeast, e.g., *Starmerella* (*Candida*) *bombicola, Candida apicola, Candida batistae, Candida floricola, Candida riodocensis, Candida stellate* and/or *Candida kuoi*. In a specific embodiment, the microorganism is *Starmerella bombicola*, e.g., strain ATCC 22214.

In one embodiment, cultivation comprises inoculating a fermentation reactor comprising a liquid growth medium with a SLP-producing yeast to produce a yeast culture; and cultivating the yeast culture under conditions favorable for production of SLP. Methods and systems for cultivating yeast cultures for production of SLP and other biosurfactants can be found in International Patent Application Publication No. WO 2019/133555 A1, which, to the extent that it does not conflict with the subject disclosure, is incorporated by reference herein.

The method of cultivation can comprise providing oxygenation to the growing culture. In certain embodiments, dissolved oxygen (DO) levels are maintained at about 25% to about 75%, about 30% to about 70%, about 35% to about 65%, about 40% to about 60%, or about 50% of air saturation.

The pH of the culture should be suitable for the microorganism being cultivated, and can be altered as desired in order to achieve a particular type or form of SLP in the culture. Buffers, and pH regulators, such as carbonates and phosphates, may be used to stabilize pH near a preferred value. The base solution can be included in the growth medium and/or it can be fed into the fermentation reactor during cultivation to adjust the pH as needed.

In some embodiments, the pH of cultivation is about 2.0 to about 7.0. In some embodiments, the pH is about 2.5 to about 5.5, about 3.0 to about 4.5, or about 3.5 to about 4.0. In one embodiment, the cultivation may be carried out continuously at a constant pH. In another embodiment, the cultivation may be subject to changing pH.

In one embodiment, the method of cultivation is carried out at about 5° to about 100° C., about 15° to about 60° C., about 20° to about 45° C., about 22° to about 30° C., or about 24° to about 28° C. In one embodiment, the cultivation may be carried out continuously at a constant temperature. In another embodiment, the cultivation may be subject to changing temperatures.

According to the subject methods, the microorganisms can be incubated in the fermentation system for a time period sufficient to achieve a desired effect, e.g., production of a desired amount of cell biomass or a desired amount of one or more microbial growth by-products. The biomass content may be, for example from 5 g/l to 180 g/l or more, or from 10 g/l to 150 g/l.

In certain embodiments, fermentation of the yeast culture occurs for about 100 to 150 hours, or about 115 to about 125 hours, or about 120 hours.

The resulting yeast fermentation product comprises a mixture of hydrophilic and hydrophobic SLP molecules. According to the subject methods, and as shown in FIG. 3A, the hydrophilic and hydrophobic SLP of the SLP mixture are separated after the submerged fermentation cycle is complete. In this step, the entire yeast fermentation product can be left to sit with no disturbance for, e.g., 10 to 50 hours, either in the fermentation reactor, or after being collected into a separate, first collection container. A layer, or fraction, rich in hydrophobic SLP, the majority of which comprises lactonic SLP (LSL) with trace amounts of hydrophobic acidic SLP (ASL) (e.g., di-acetylated and/or mono-acetylated ASL), will settle at the bottom of the reactor or container.

The settled crude hydrophobic SLP fraction can be collected into a second collection container, and a supernatant (crude hydrophilic SLP fraction), which comprises dissolved hydrophilic SLP (e.g., non-acetylated ASL) as well as cells, broth components, fatty acids, and dissolved glucose, is thus separated.

In certain embodiments, the crude hydrophobic SLP fraction further comprises impurities, such as yeast cells, glucose, fatty acids and/or other residual materials from fermentation. Thus, in preferred embodiments, the method further comprises purifying the hydrophobic SLP fraction using, for example, a "water-washing" method (FIG. 3B) and, optionally, an "oil-washing" method (FIG. 4).

Water-washing according to the subject invention comprises, generally:

a) mixing the crude hydrophobic SLP fraction with deionized water continuously for about 30 to 300 minutes at a temperature of about 50 to 80° C.;

b) allowing the hydrophobic SLP-water mixture to rest for about 8 to 24 hours, wherein the mixture stratifies into a bottom layer comprising hydrophobic SLP and water, a middle layer comprising water and impurities, and a top foamy layer comprising additional impurities; and c) collecting the bottom layer into a third collection container and adjusting the water percentage of the bottom layer to produce a water-washed (purified) hydrophobic SLP fraction.

Advantageously, the mixing of DI water with the crude hydrophobic SLP fraction sequesters and accumulates impurities without requiring the use of harmful solvents. In certain embodiments, the ratio of SLP to DI water in a) is about 10:1, 5:1, 4:1, or 3:1 by volume.

In preferred embodiments, the final water percentage of the water-washed hydrophobic SLP fraction is about 20% to 30% by volume. Thus, in some embodiments, purified water can be added to the water-washed hydrophobic SLP fraction or water and mixed continuously for about 1 to 150 minutes at 60 to 80° C. In other embodiments, water can be removed via, for example, spray drying or cyclone evaporation. In certain embodiments, a water percentage of about 10 to 15% results in crystallization of the SLP, and is therefore generally undesirable.

In some embodiments, the water-washed hydrophobic SLP fraction, while free or mostly free of impurities, still comprises a percentage of fatty acid and/or oil impurities due to their hydrophobic nature. For example, in certain embodiments, the water-washed hydrophobic SLP fraction may comprise about 10% to 30% by volume of a fatty acid, such as oleic acid.

Thus, in certain embodiments, the method can further comprise "oil-washing" the water-washed hydrophobic SLP fraction, for removing the fatty acid and/or oil impurities to produce a purified SLP fraction with even greater purity.

In preferred embodiments, oil-washing comprises applying an oil, preferably a vegetable oil such as canola oil, to the water-washed SLP fraction. The mixture of the oil and the water-washed SLP fraction is mixed at an elevated temperature (e.g., about 60 to 80° C.) for at least 55 to 110 minutes, after which it is allowed to sit undisturbed for, for example, 8 to 24 hours. The undisturbed mixture stratifies into an oil layer and an SLP-water layer. The oil layer can be removed to, for example, a fourth collection container, leaving the SLP layer-water layer with at least 50%, 80%, 98% or more of the fatty acid and oil impurities removed therefrom. The hydrophobic SLP layer-water layer, or oil-washed (purified) SLP fraction, mainly comprises hydrophobic SLP (LSL, and some di-acetylated and/or mono-acetylated ASL).

In certain embodiments, the method comprises functionalizing the hydrophobic SLP of the hydrophobic SLP fraction based on the application for which it will be used. In certain embodiments, "functionalizing" means altering the functional properties of the SLP molecule. Functionalization of the SLP molecule is preferably not performed during fermentation by, for example, altering the parameters of fermentation and/or using a genetically-modified microorganism, but rather is performed post-fermentation.

Functionalization can be performed by, for example, modifying the molecular structure of a SLP molecule. In some embodiments, modifying the molecular structure of the SLP molecules alters the functional properties of a SLP fraction and/or SLP composition, for example, properties such as HLB, solubility, foaming, detergency, emulsification, demulsification, and/or wettability altering capabilities.

In some embodiments, functionalization is performed to a SLP molecule while it is part of a crude form yeast fermentation product. In some embodiments functionalization is performed to a SLP molecule after it has been purified from a crude form yeast fermentation product.

In certain preferred embodiments, the HLB of a SLP fraction and/or a SLP composition is altered. HLB is the balance of the size and strength of the hydrophilic and lipophilic moieties of surface-active molecules or compositions. HLB values range from 0 to 20, with lower HLB (e.g., less than about 9) being more oil-soluble and suitable for water-in-oil emulsions, and higher HLB (e.g., greater than about 9) being more water-soluble and suitable for oil-in-water emulsions.

In certain embodiments, altering the HLB corresponds with alteration of the water solubility of SLP molecules in a composition, wherein increased water solubility corresponds with increased HLB value, and decreased water solubility corresponds with decreased HLB value. In preferred embodiments, the HLB of the SLP fraction and/or SLP composition is 9 or greater. Even more preferably, the HLB is 10 or greater, 12 or greater, 14 or greater, 16 or greater, or about 18-20 or greater.

In certain embodiments, hydrophobic SLP are functionalized by being converted into hydrophilic SLP molecules. This can be performed by, for example, modifying the molecular structure of the hydrophobic SLP molecules. In some embodiments, the hydrophobic SLP fraction is in crude form. In other embodiments, the hydrophobic SLP fraction has been purified via water-washing and/or oil-washing.

Figure 5:
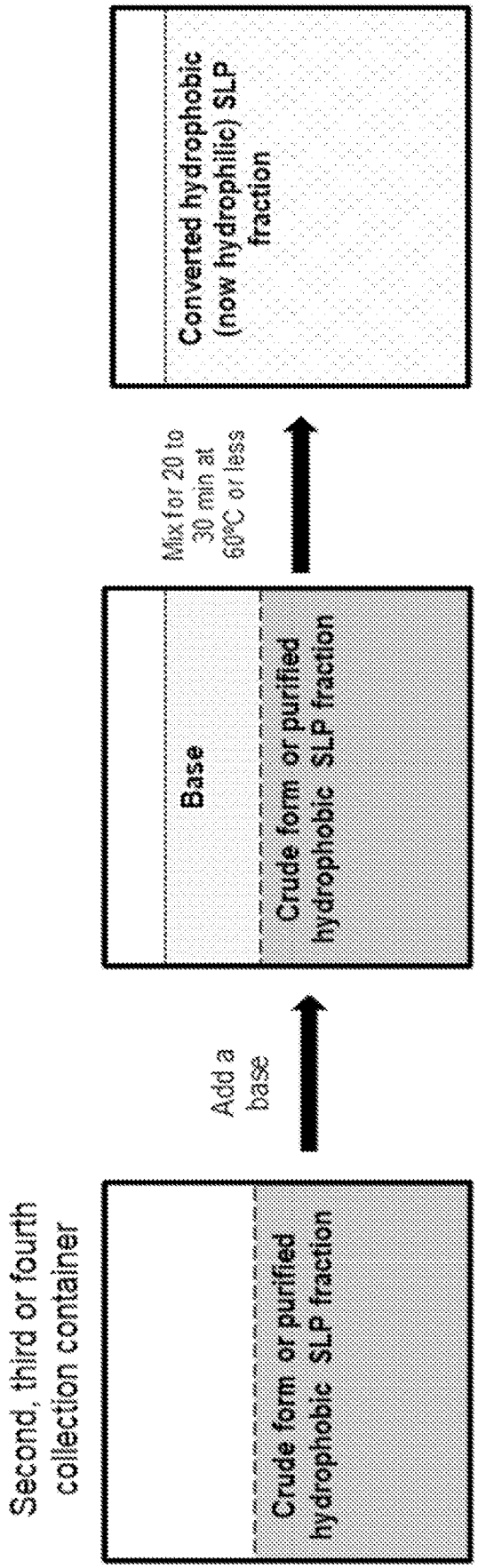
FIG. 5 shows a schematic of the treatment of the hydrophobic SLP fraction, in crude or purified form, with a base in order to convert the fraction into a hydrophilic SLP fraction.
Figure 6:
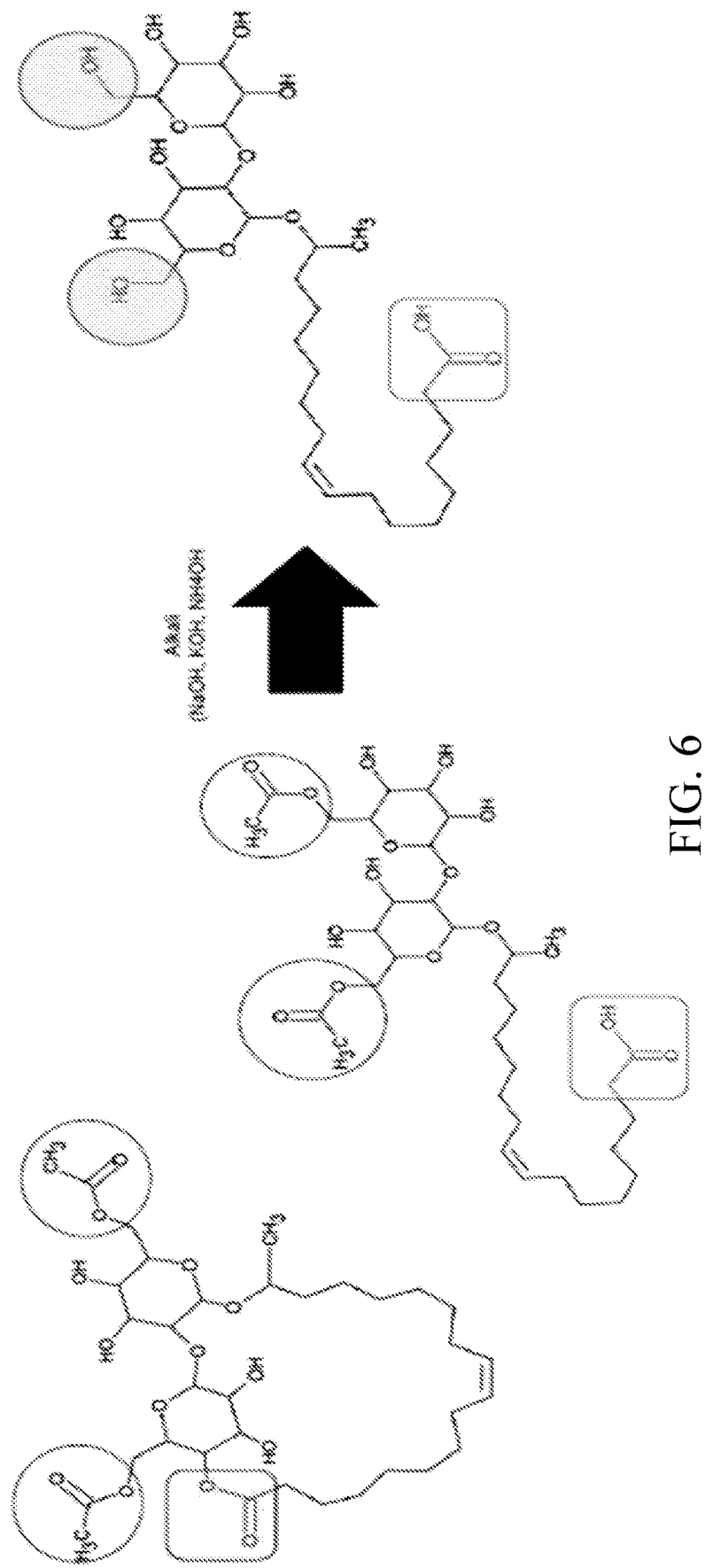
FIG. 6 shows ring opening of LSL and de-acetylation of ASL, both of which can be achieved via alkaline hydrolysis.
Figure 7A:
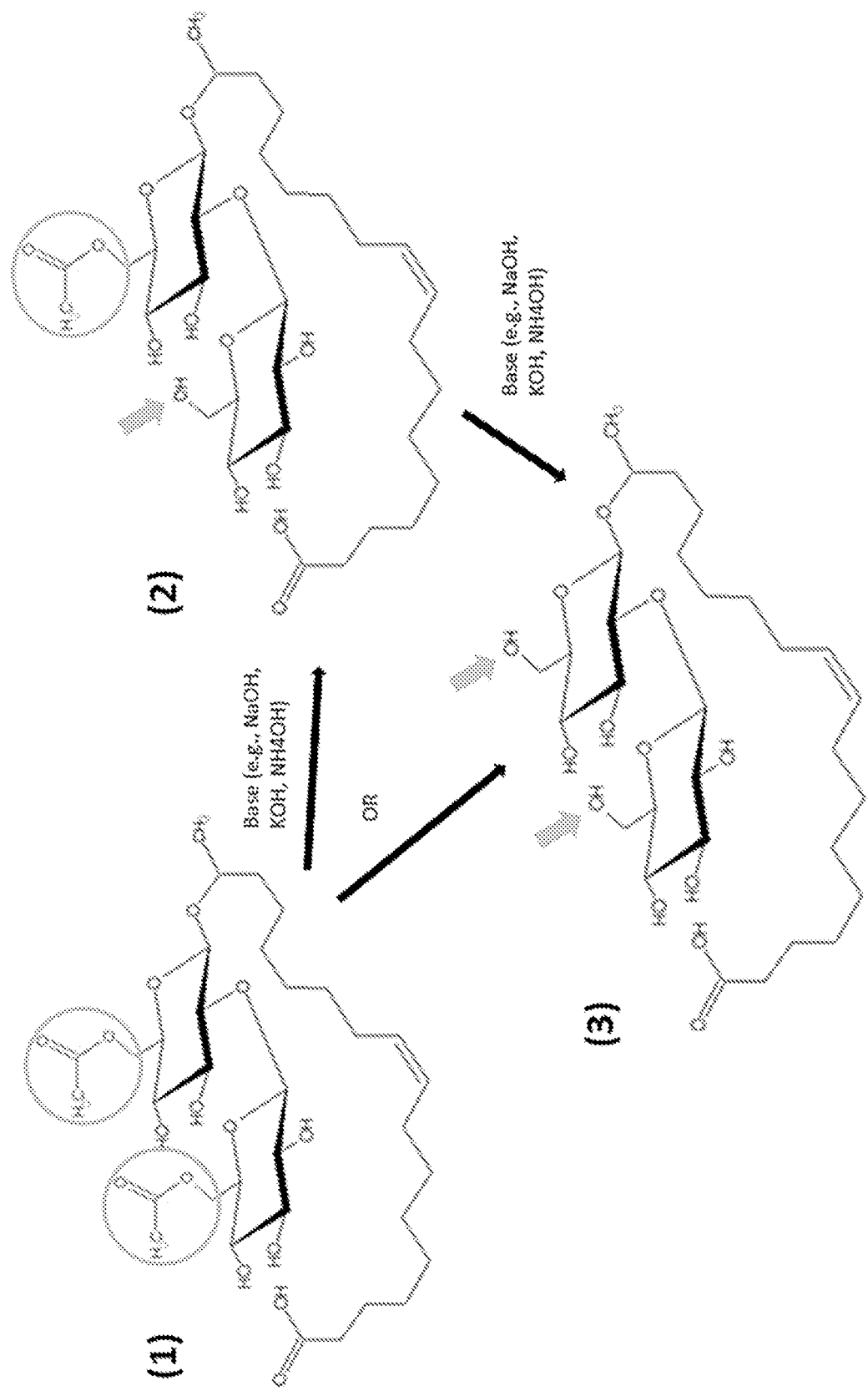
FIGS. 7A-7B show (7A) alkali-mediated deacetylation of ASL molecules and (7B) alkali-mediated deacetylation of LSL molecules. The circles depict the acetyl groups of a (1) di-acetylated or (2) mono-acetylated molecule. The grey arrows depict the location of removed acetyl groups to produce a (2) mono-acetylated or (3) non-acetylated molecule.
Figure 7B:
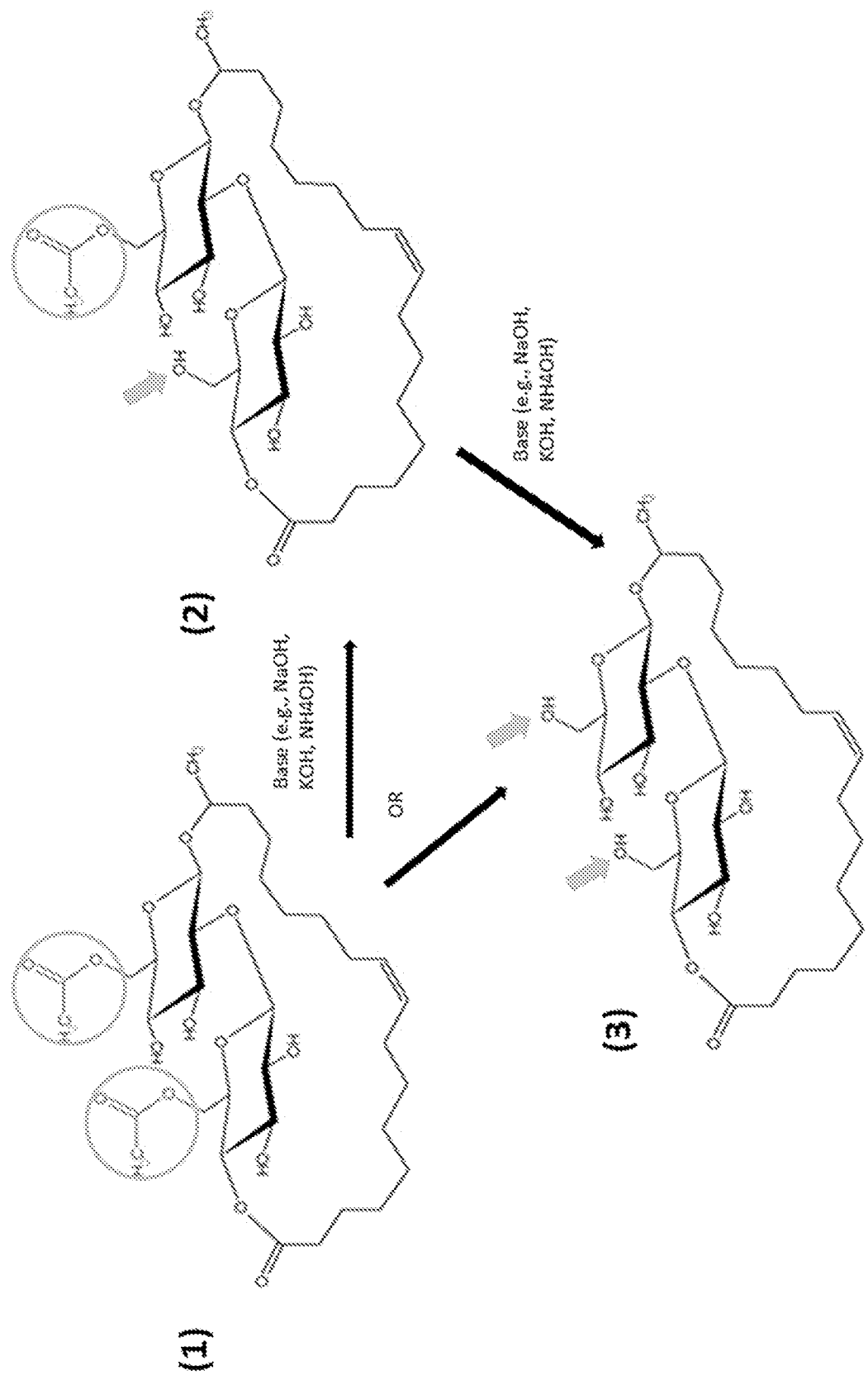
Figures 8A, 8B:
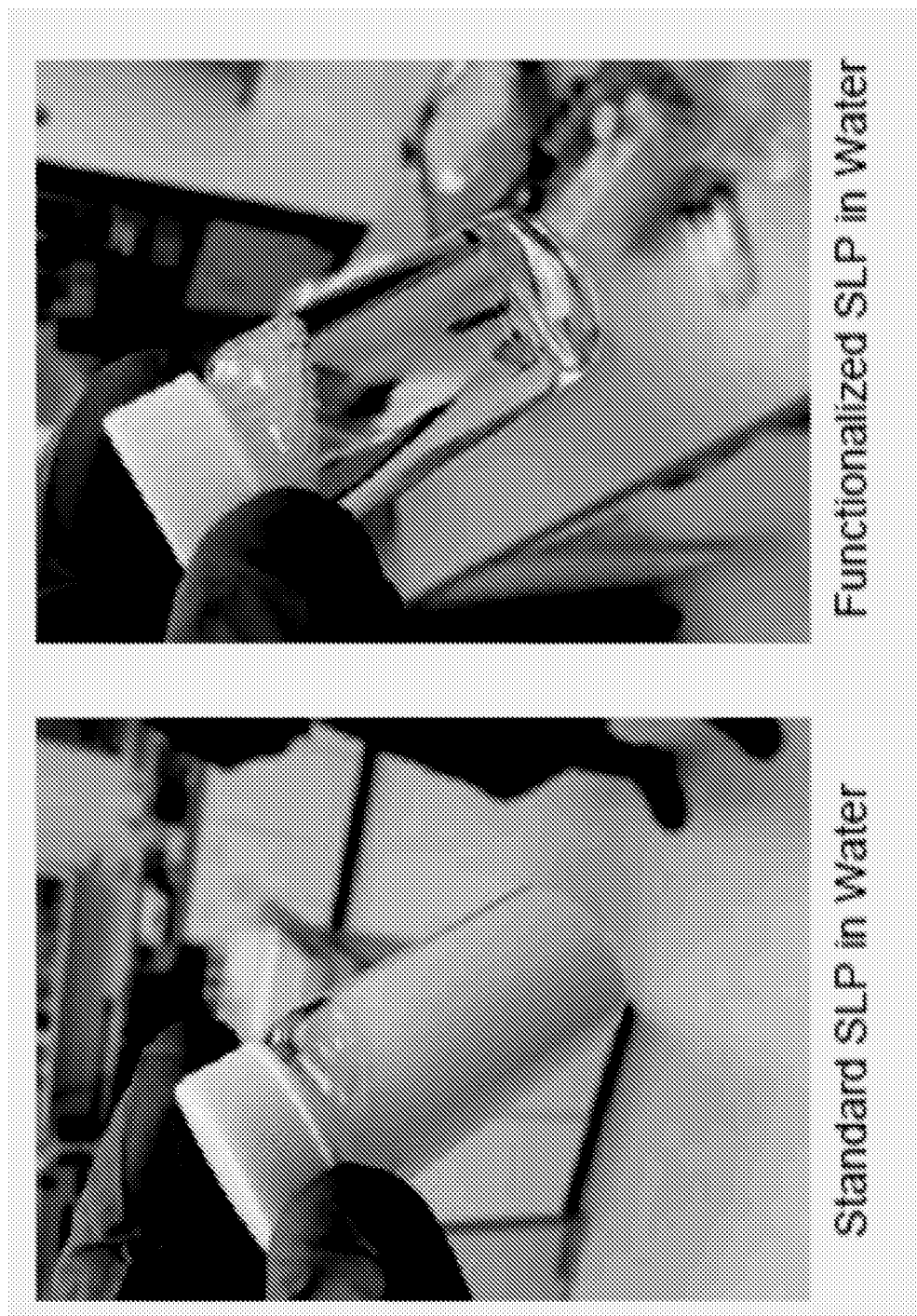
FIGS. 8A-8B show the difference in solubility of SLP molecules in water—after fermentation but prior to functionalization (8A), and after functionalizing according to embodiments of the subject invention (8B).

In some embodiments, the method comprises subjecting a hydrophobic SLP fraction to treatment with a concentrated base (alkaline hydrolysis) in order to increase HLB and/or water solubility. FIGS. 5-6. For example, in one embodiment, a hydrophobic SLP fraction can be mixed with a 10 to 25% base solution, such as, for example, a solution of sodium hydroxide, potassium hydroxide, and/or ammonium hydroxide, to adjust the pH to about 4.0 to 10.0, about 6 to about 9.5, or about 6.5 to 7.5.

In certain embodiments, the pH is adjusted by titrating small amounts of a 10 to 25% base solution into the fraction at a temperature that does not exceed 60° C. in order to prevent SLP degradation due to extreme increases in pH and/or temperature. The titrations can be applied at a rate of, for example, about 0.01 ml/L to 100 ml/L, about 0.1 ml/L to 75 ml/L, about 0.5 ml/L to 50 ml/L, or about 1 ml/L to 25 ml/L of the fraction. The basic mixture is then mixed for about 20 to 30 minutes.

In some embodiments, the increased pH results in conversion of LSL molecules to more water-soluble ASL molecules via alkali-mediated hydrolysis of the lactone ring. FIGS. 6, 7A-7B, 8A-8B. Thus, in preferred embodiments, the hydrophobic SLP fraction is shifted towards a prevalence of ASL over LSL, for example, a ratio of 70:30, ASL to LSL.

In another embodiment, the increased pH results in alkali-mediated de-acetylation of mono- or di-acetylated ASL or LSL molecules.

Figure 9:
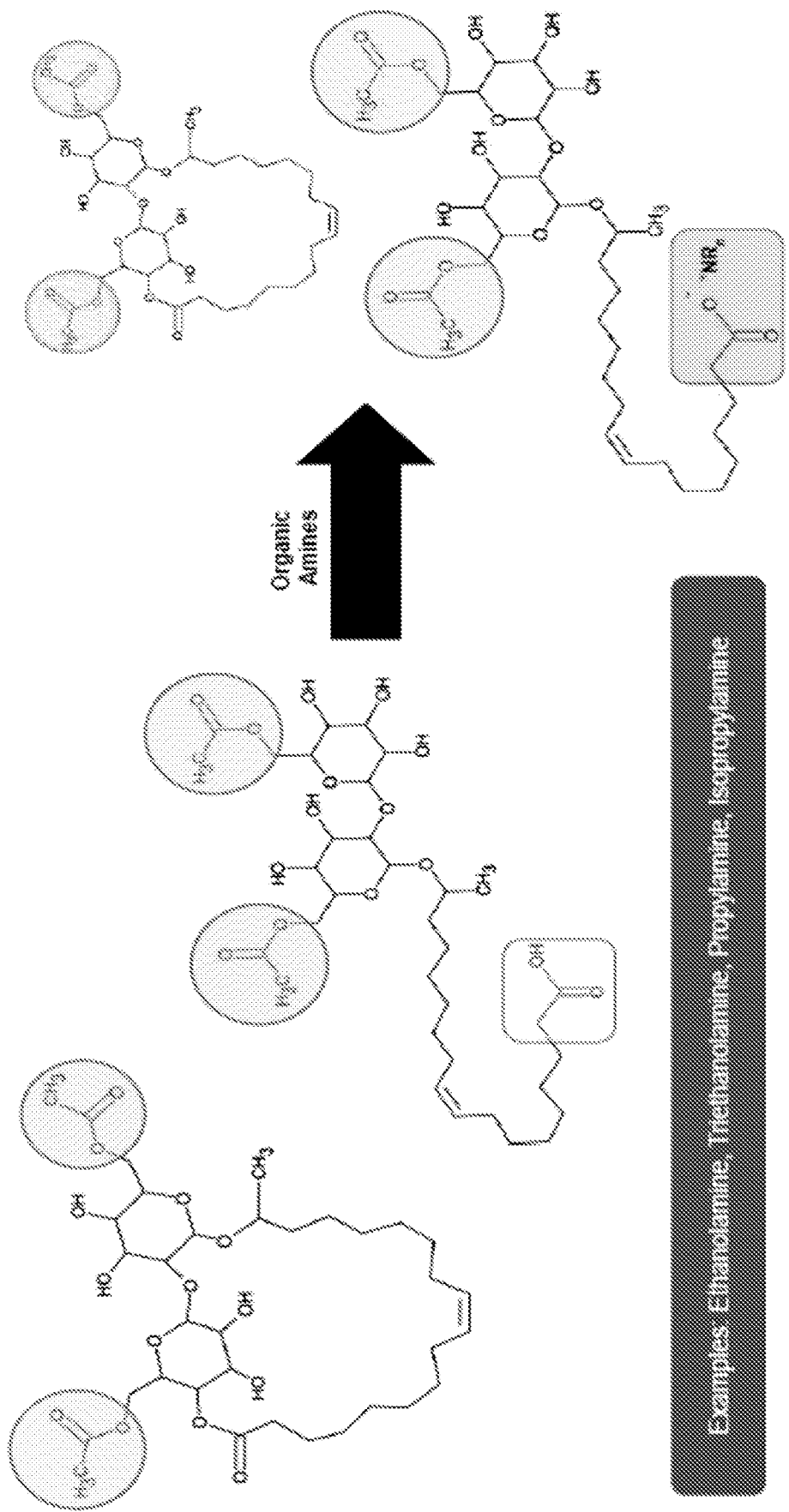
FIG. 9 shows a method for increasing the solubility of an ASL molecule by deprotonating the carboxylic acid moiety of the fatty acid chain via reaction with an organic amine.

In some embodiments, an ASL molecule or a fraction comprising an ASL molecule can be mixed with an organic amine, such as ethanolamine, triethanolamine, propylamine, and/or isopropylamine, resulting in deprotonation of the carboxyl group of the ASL molecule's fatty acid chain, thus increasing the water solubility of the molecule. FIG. 9. In certain embodiments, the rate at which the organic amine is applied is about 0.01 ml/L to 100 ml/L, about 0.1 ml/L to 75 ml/L, about 0.5 ml/L to 50 ml/L, or about 1 ml/L to 25 ml/L of the ASL molecule or fraction.

In certain embodiments, the method can further comprise stabilizing the converted hydrophobic (now hydrophilic) SLP molecules to prevent degradation by long-term high pH and/or temperature. For example, in some embodiments this can be achieved by adding an acid to the mixture to arrive at a pH of about 6.5 to 7.5, or about 7.0 to 7.2.

In preferred embodiments, concentrated citric acid is added to the mixture and mixed for 55 to 110 minutes, or about 60 to 90 minutes.

In one embodiment, the method can comprise mixing the converted hydrophobic (now hydrophilic) SLP fraction with water or another liquid, depending upon the desired use(s) for the composition.

In some embodiments, the converted SLP fraction can be stored in separate containers until use. The storage time is preferably short. Thus, the storage time may be less than 60 days, 45 days, 30 days, 20 days, 15 days, 10 days, 7 days, 5 days, 3 days, 2 days, 1 day, or 12 hours.

In some embodiments, the method can comprise mixing two or more SLP fractions with one another. For example, in certain embodiments, the converted hydrophobic (now hydrophilic) SLP fraction can be mixed back with the original hydrophilic SLP fraction from which it was separated in the initial yeast fermentation product. In some embodiments, the hydrophilic SLP fraction has been purified prior to mixing the converted SLP fraction therewith.

In certain embodiments, the types and/or ratios of SLP fractions and/or molecules that are mixed together are determined based on what HLB value is desired for the final composition. For example, greater proportions of ASL molecules correspond with greater HLB, and greater proportions of LSL molecules correspond with lower HLB value for the final composition.

In some embodiments, the method can comprise mixing one or more SLP fractions produced according to the subject methods with water or another carrier. Furthermore, depending on the desired use for the SLP composition, additional components can also be added, for example, polymers, viscosifying agents, deflocculants, lubricants, fluid loss additives, friction reducers, essential oils, solvents, pH adjusters, biocides, microorganisms, chelating agents, non-biological surfactants, builders and/or other additives. The compositions can be useful as, for example, cleaning products, detergents, oil-in-water emulsifiers, corrosion inhibitors, foaming agents, and many other uses.

Advantageously, the subject invention helps improve the efficiency of producing SLP-based compositions having specific functions, without the need for altering the parameters of fermentation and/or, in some embodiments, without the need for using genetically-modified SLP-producing microorganisms.

Compositions

In certain embodiments, the subject invention provides useful compositions comprising one or more SLP fractions and/or molecules produced according to the subject methods. In preferred embodiments, the compositions have an HLB greater than 9, greater than 10, greater than 12, greater than 14, greater than 16, greater than 18, or greater than 20. The compositions can have uses in many different industries, as exemplified in Table 1 below.

45% to 55%, or 50% by volume or weight of a non-acetylated ASL or mono-acetylated ASL. In certain embodiments, the mono-acetylated ASL is obtained via alkali-mediated deacetylation of a di-acetylated ASL. In certain embodiments, the non-acetylated ASL is obtained via alkali-mediated de-acetylation of a di-acetylated ASL and/or a mono-acetylated ASL.

In some embodiments, the composition can comprise 0% to 100%, 5% to 95%, 10% to 90%, 15% to 85%, 20% to 80%, 25% to 75%, 30% to 70%, 35% to 65%, 40% to 60%, 45% to 55%, or 50% by volume or weight of a non-, mono-, or di-acetylated LSL. In certain embodiments, the mono-acetylated LSL is obtained via alkali-mediated deacetylation of a di-acetylated LSL. In certain embodiments, the non-acetylated LSL is obtained via alkali-mediated deacetylation of a di-acetylated LSL and/or a mono-acetylated LSL.

In certain embodiments, the type(s) and/or ratio of SLP molecule(s) in the composition are determined based on what hydrophile-lipophile balance (HLB) value is desired for the SLP composition. In preferred embodiments, the HLB of the composition is 9 to 20 or greater, 10 to 19, 11 to 18, 12 to 17, 13 to 16, or 14 to 15.

In certain embodiments, the compositions comprise at least 5% by volume of a liquid carrier. In some embodi-

TABLE 1

Exemplary uses for high-HLB compositions based on HLB range

| HLB range | 10-14 | 13-18 | 19-22 |
| --- | --- | --- | --- |
| Petroleum Industry | Cleaning of oil tanks and pipelines | Paraffin/asphaltene inhibition | Corrosion inhibition |
| Cleaning Products | Active cleaning ingredient in detergents and HI&I cleaners | Emulsifier for cleaning formulations (oil-in-water) | Foaming agent |
| Agriculture | Improved soil nutrient and water retention | Washing of pollutants from soil | Antiviral pesticide treatment |
| Animal care | Anti-nematode treatment | Antiviral treatment | Antiviral treatment |
| Construction | Stabilizer for asphalt emulsions | Corrosion inhibition | Glue additive |
| Personal Care and Cosmetics | Moisturizing agent | Anti-age spot product | Foaming agent |
| Food | Stabilizer | Emulsifier (oil-in-water) | Antiviral preservative |
| Pharmaceuticals | Coating for nanocapsules | Emulsifier (oil-in-water) | Antiviral agent |
| Climate Change Mitigation | Reduction of nitrous oxide emissions due to fertilizer over-use (due to improved nutrient and water retention in soil) | Remediation of polluted soils and oil spills | Reduction of metal content in soil |

In certain embodiments, the compositions comprise at least 50%, at least 60%, at least 70%, at least 75%, at least 80%, at least 85%, at least 90%, or at least 95% SLP molecule(s) by volume or by weight.

In preferred embodiments, the compositions comprise a majority of hydrophilic SLP molecules having a structure according to General Formula (1) and/or General Formula (2), supra, that has been produced according to embodiments of the subject invention.

For example, in some embodiments, the composition can comprise 0% to 100%, 5% to 95%, 10% to 90%, 15% to 85%, 20% to 80%, 25% to 75%, 30% to 70%, 35% to 65%, 40% to 60%, 45% to 55%, or 50% by volume or weight of a non-, mono-, or di-acetylated ASL obtained via alkali-mediated hydrolysis of the lactone bond of a non-, mono-, or di-acetylated LSL.

In some embodiments, the composition can comprise 0% to 100%, 5% to 95%, 10% to 90%, 15% to 85%, 20% to 80%, 25% to 75%, 30% to 70%, 35% to 65%, 40% to 60%, ments, the composition comprises 10% to 75%, 15% to 80%, 20% to 85%, or 25% to 90% by volume of the liquid carrier. Liquid carriers can include, for example, water, salt water, fresh water, brine, produced water, methanol, ethylene glycol, and/or other alcohols.

In some embodiments, the compositions can comprise additional components depending on the intended use(s). For example, the composition can further comprise from 0.1% to 85%, 1% to 75%, 5% to 50%, 10% to 40%, or 20% to 30% by volume of a polymer, viscosifying agent, defloc-culant, lubricant, fluid loss additive, friction reducer, solvent, pH adjuster, biocide, essential oil, sulfide scavenger, microorganism, chelating agent, surfactant, builder and/or other components.

In certain embodiments, the subject invention provides service fluid compositions comprising one or more functionalized SLP molecules.

SLP-based compositions can be advantageous for use in the oil and gas industry for a wide variety of petroleum industry applications, including, but not limited to, enhancement of crude oil recovery from an oil-containing formation; stimulation of oil and gas wells (to improve the flow of oil into the well bore); removal of contaminants and/or obstructions such as paraffins, asphaltenes and scale from equipment such as rods, tubing, liners, tanks and pumps; prevention of the corrosion of oil and gas production and transportation equipment; reduction of $H_2S$ concentration in crude oil and natural gas; reduction in viscosity of crude oil; upgrading heavy crude oils and asphaltenes into lighter hydrocarbon fractions; cleaning tanks, flowlines and pipelines; enhancing the mobility of oil during water flooding though selective and non-selective plugging; and hydraulic fracturing.

Thus, exemplary service fluid compositions according to the subject invention include, but are not limited to, water-based drilling fluids, water-in-oil demulsifiers, sludge removal treatments, crude oil viscosity reducers, corrosion inhibitors, reservoir wettability modifiers, water flooding injection fluids, polymer flooding fluids, fracturing fluids, matrix stimulation fluids, hydrocarbon-based treatment fluids, paraffin and/or asphaltene removers and/or dispersants, workover fluids, packer fluids, completion fluids, diverter fluids and/or oil displacement fluids.

Advantageously, the subject methods do not require complicated equipment or high energy consumption, and thus reduce the capital and labor costs of producing surfactants on a large scale. Furthermore, the subject invention simplifies the processes required to obtain SLP molecules and/or SLP-containing compositions with a desired solubility without requiring alteration of fermentation parameters or use of genetically-modified microorganisms.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Cultivation of *Starmerella bombicola* for SLP Production and Purification of SLP Preparation A stainless steel fermentation reactor is used for the production of SLP. The reactor comprises about 150 gallons of water, into which a medium comprising dextrose (25 to 150 g/L), yeast extract (1 to 10 g/L), canola oil (25 ml/L to 110 ml/L) and urea (0.5 to 5 g/L) is added.

The reactor comprises a mixing apparatus for continuous agitation and mixing of the culture. The reactor with medium is steamed at 100° C. for about 60 minutes in order to sterilize the reactor and the growth medium.

The reactor is then allowed to cool down. Once the reactor reaches about 35° C., antibiotics are added to the medium to prevent bacterial contamination. The antibiotic composition comprises 300 g streptomycin and 20 g oxytetracycline dissolved in 4 L DI water. Other reactor tubing and openings are sprayed with isopropyl alcohol (IPA) to sterilize them.

Small-scale reactors are used for growing *Starmerella bombicola* inoculum cultures. The culture is grown for at least 42 to 48 hours at 26 to 28° C. in the small-scale reactors.

Once the stainless-steel fermentation reactor reaches 30° C., it is then inoculated with about 25 L of the inoculum culture.

Fermentation

The temperature of fermentation is held at 23 to 28° C. After about 22 to 26 hours, the pH of the culture is set to about 3.0 to 4.0, or about 3.5, using 20% NaOH. The fermentation reactor comprises a computer that monitors the pH and controls the pump used to administer the base, so that the pH remains at 3.5.

After about 6-7 days of cultivation (120 hours+/−1 hour), if 7.5 ml of a SLP layer is visible with no oil visible and no glucose detected (e.g., about 0% to 0.5%), the batch is ready for harvesting.

Harvesting

The culture is left in the fermentation reactor or harvested to a first collection container and left undisturbed for 24 to 48 hours. A layer, or fraction, of hydrophobic SLP settles to the bottom of the culture. FIG. 3A.

Example 2—Water Washing for Purification of Hydrophobic SLP Molecules

Figure 3B:
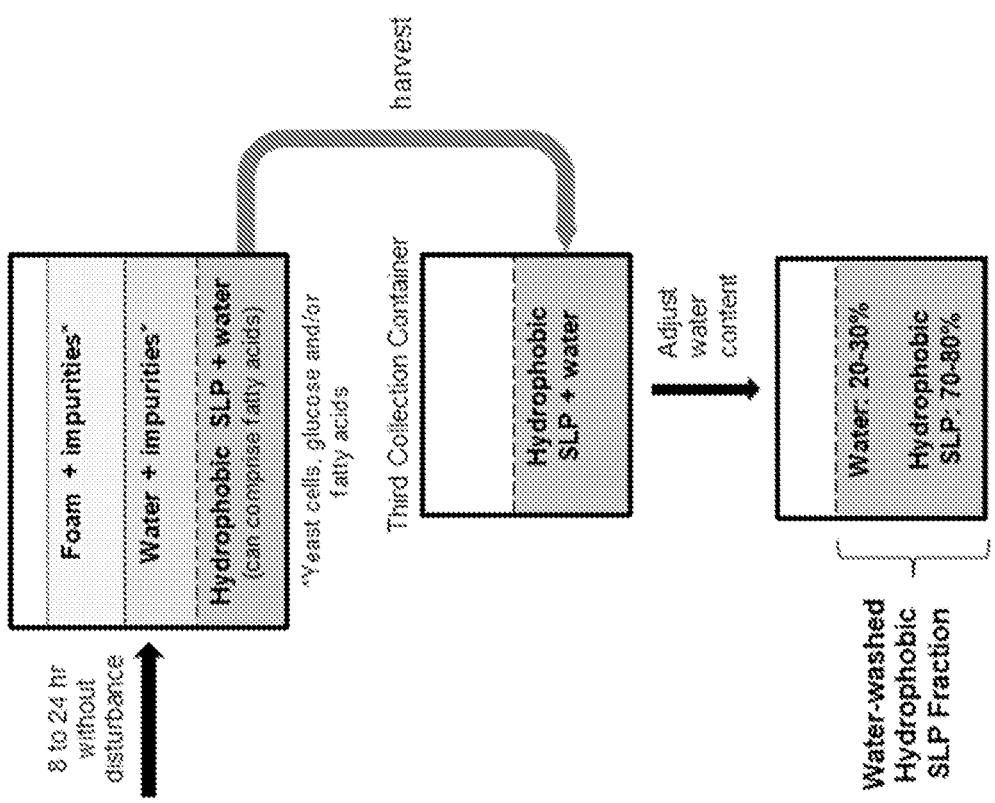
Figure 3B:
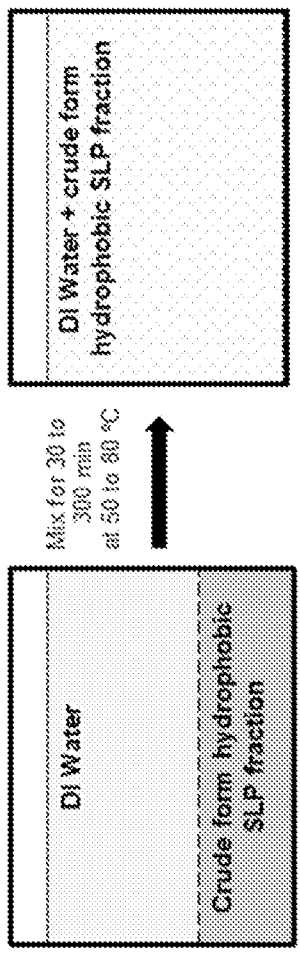
Figure 4:
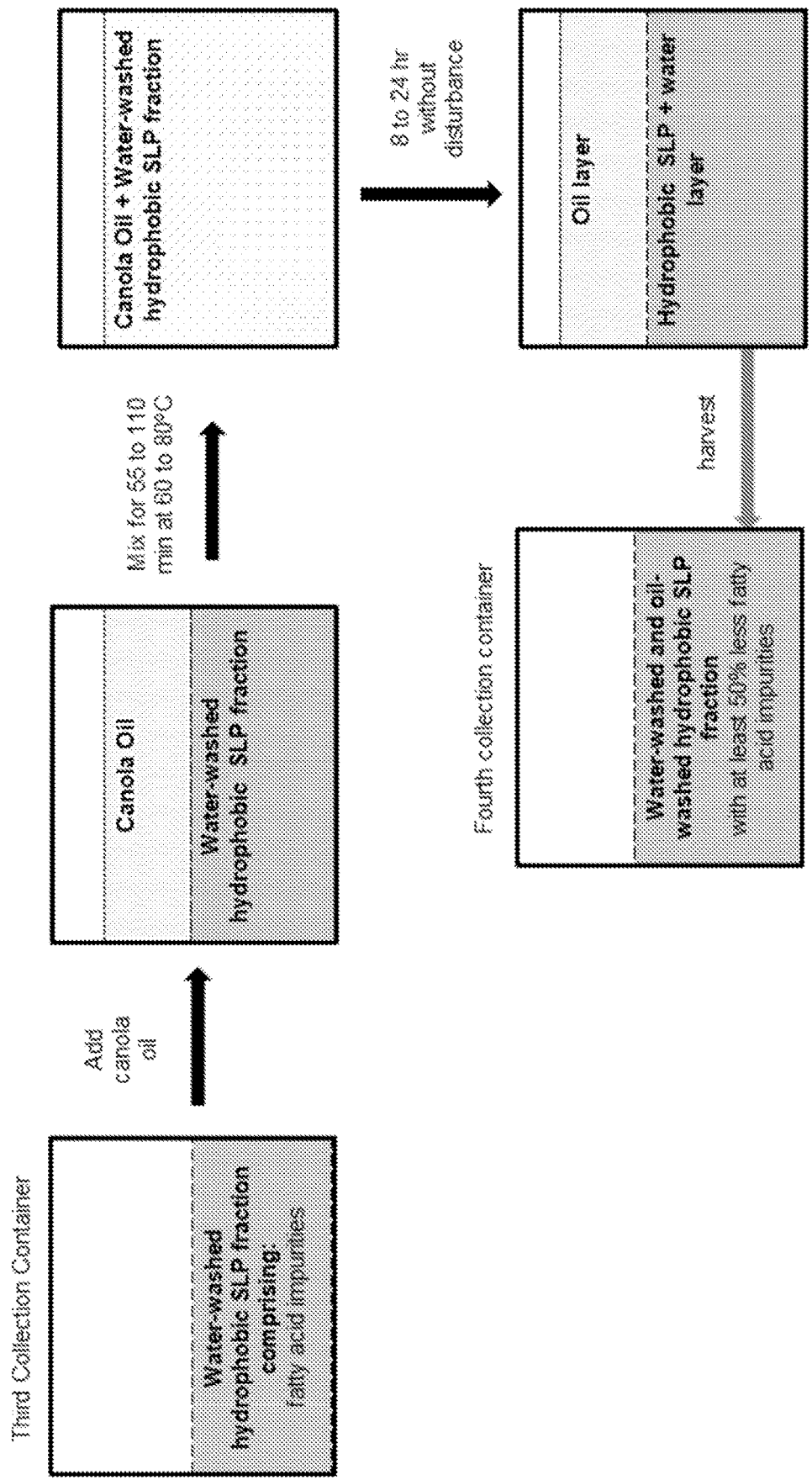
FIG. 4 shows a schematic of purifying the hydrophobic SLP fraction via oil-washing according to an embodiment of the subject methods.

As depicted in FIGS. 3A-3B, the settled crude form hydrophobic SLP fraction, containing SLP ratios of approximately 60-70% LSL to 30-40% hydrophobic ASL, is harvested to a second collection container, leaving behind a supernatant. DI water is mixed with the crude form hydrophobic SLP fraction at a ratio of 4:1 to 3:1, SLP to water (volume). The hydrophobic SLP-water mixture is warmed to a temperature of about 60° C. to 70° C. and mixed for 1 to 2 hours.

Afterwards, the mixture is allowed to rest for 8 to 24 hours, or until the temperature lowers naturally to about 25° C. to 35° C. The mixture forms three layers: a bottom layer comprising hydrophobic SLP and water; a middle layer comprising water and impurities, such as yeast cells, glucose, and fatty acids; and a top layer comprising impurities in foam. In some embodiments, the bottom layer comprises residual fatty acid impurities as well.

The bottom hydrophobic SLP-water layer is transferred from the second container into a third container, and the water content is adjusted so that it is below 50% but above about 10% to 15% by volume. Ideally, the water content is about 20 to 30% by volume.

The water content can be reduced via evaporation, using either a cyclone evaporator or a spray dryer at 60° C. The water content can be increased by adding purified water and mixing it with the SLP for about 1 to 2 hours at 70° C.

The purified product, the water-washed hydrophobic SLP fraction, has an HLB of about 1 to 8, and comprises about 80 to 90% hydrophobic SLP molecules, such as LSL, and di-acetylated and/or mono-acetylated ASL.

The middle and top layers can be subjected to water washing again to recover additional hydrophobic SLP.

Example 3—Oil-Washing of Water-Washed Hydrophobic SLP Fraction

To obtain a hydrophobic SLP fraction with reduced oil impurities, the water-washed hydrophobic SLP fraction is further purified through oil-washing. FIG. 4. Canola oil is added to the water-washed hydrophobic SLP fraction at a ratio of 1:2 (added oil:SLP), 2:1, 5:1, or 10:1.

Then, the water-washed hydrophobic SLP fraction and oil are mixed for 2 hours, or about 1 to 2.5 hours at a temperature of 60° C. After mixing, the entire mixture is left to sit undisturbed overnight (or about 16 hours) to stratify the hydrophobic SLP and water layer from the added oil layer, which now contains oil and fatty acid and/or oil impurities.

After the stratification of the layers, the oil layer can be removed to obtain a hydrophobic SLP product with greater purity.

As illustrated in Tables 2 and 3, the majority of fatty acids in the water-washed SLP hydrophobic SLP fraction can be removed. Furthermore, as illustrated in Table 1, the addition of canola oil at a ratio of 10:1 (canola oil:SLP) removes 98% of the fatty acids from the water-washed SLP hydrophobic SLP fraction. This is a significant decrease of the fatty acid concentration, leaving an oil-washed SLP fraction with a fatty acid concentration of 0.48%, compared to the 23.54% fatty acid concentration of the water-washed SLP composition.

TABLE 2

Fatty acid content in oil-washed hydrophobic SLP fraction (23.53% Fatty acids initially)

| Ratio of canola oil to SLP | Fatty acid concentration after oil purification |
|---|---|
| 1:2 | 9.5% |
| 2:1 | 4.46% |
| 5:1 | 2.51% |
| 10:1 | 0.48% |

TABLE 3

Fatty acid content in oil-washed hydrophobic SLP fraction (19.62% Fatty acids initially)

| Ratio of canola oil to SLP | Fatty acid concentration after oil purification |
|---|---|
| 5:1 | 2.17% |

Table 4 illustrates that the composition purified with the canola oil has a lower CMC compared to the water-washed SLP composition.

TABLE 4

CMC of hydrophobic SLP fractions

| Sample | CMC |
|---|---|
| Water-washed SLP fraction | 113 |
| Oil-washed SLP fraction | 57 |

Example 4—Comparison of Characterisitics of Purified SLP Products

Typical Characteristics of Water-Washed Hydrophobic SLP Fraction:
  CMC from 50 to 100;
  Surface Tension Reduction at CMC from 35 to 39;
  HLB from 2 to 7;
  No phase separation;
  No live cells;
  Glucose content no higher than 0.1%;
  Not soluble in water;
  Dispersible in water, creates milky solution;
  No foam produced when mixed with water.

Typical Characteristics of Converted Hydrophobic SLP Fraction (Now Hydrophilic):
  Translucent;
  Fully water soluble;
  Highly foamy;
  CMC from 100 to 150 ppm;
  Surface tension reduction at CMC from 35 to 39;
  HLB around 18 to 20, or higher;
  No phase separation;
  No live cells;
  Glucose content no higher than 0.5%;
  Fatty acid content is variable (possibly as low 0.5%).

Example 5—Foam Characteristics of Converted Hydrophobic (Now Hydrophilic) SLP Fraction Foam levels (ml) of a solution of 1% hydrophilic SLP, with a pH of 6.7, HLB about 20, and fatty acid content of 13%, were measured over time.

TABLE 5

Foam measurement over time

| Time (min) | Foam measurement (ml) |
|---|---|
| 0 | 45 |
| 5 | 44 |
| 10 | 42 |
| 15 | 33 |
| 20 | 33 |
| 25 | 29 |
| 30 | 28 |
| 35 | 25 |
| 40 | 19 |
| 45 | 18 |
| 50 | 17 |
| 55 | 17 |

Example 6—Chemical Analysis of Converted Hydrophobic (Now Hydrophilic) SLP Fraction Hydrophilic SLP compositions prepared according to methods of the subject invention were analyzed using Mass Spectroscopy to determine the types and amounts of SLP molecules (species) within the composition. The results are reported below in Tables 6-8.

TABLE 6

Hydrophilic SLP Sample 1, Composition

| % Lactonic SLP | % Linear SLP | % mass of hexane extract | % Glucose | % Water by mass |
|---|---|---|---|---|
| 30.51% | 69.49% | 13.50% | 0.05% | 16.73% |

TABLE 7

Mass Spectroscopy Results, Sample 1

| SLP Species | Molecular Weight | Relative Area % | Summary | |
|---|---|---|---|---|
| Linear oleic non-acetylated | 622 | 9.94% | Total Relative LSL Area % | 30.51% |
| Lactonic oleic mono-acetylated | 646 | 11.70% | Lactonic non-acetylated | 0% |
| Linear oleic mono-acetylated | 664 | 20.74% | Lactonic mono-acetylated | 11.70% |
| Lactonic linoleic di-acetylated | 686 | 0.00% | Lactonic di-acetylated | 18.81% |
| Lactonic oleic di-acetylated | 688 | 17.91% | Total Relative ASL Area % | 69.49% |
| Lactonic stearic di-acetylated | 690 | 0.91% | Linear non-acetylated | 9.94% |
| Linear oleic di-acetylated | 706 | 34.95% | Linear mono-acetylated | 20.74% |
| Linear linoleic di-acetylated | 704 | 3.86% | Linear di-acetylated | 38.81% |

TABLE 8

Mass Spectroscopy Results, Sample 2

| SLP Species | Molecular Weight | Relative Area % | Summary | | | |
|---|---|---|---|---|---|---|
| Linear oleic non-acetylated | 622 | 21.64% | Total Relative Lactonic Area % | 31.66% | Fatty Acids | 3.19% wt |
| Lactonic oleic mono-acetylated | 646 | 27.61% | Lactonic non-acetylated | 0% | (Hexane Extract) | |
| Linear oleic mono-acetylated | 664 | 25.92% | Lactonic mono-acetylated | 27.61% | | |
| Lactonic linoleic di-acetylated | 686 | 0.00% | Lactonic di-acetylated | 4.05% | Glucose Content | 0.16% wt |
| Lactonic oleic di-acetylated | 688 | 4.05% | Total Relative Linear Area % | 68.34% | (HPLC) | |
| Lactonic stearic di-acetylated | 690 | 0.00% | Linear non-acetylated | 21.64% | | |
| Linear oleic di-acetylated | 706 | 18.51% | Linear mono-acetylated | 25.92% | Water Content | 30.42% wt |
| Linear linoleic di-acetylated | 704 | 2.27% | Linear di-acetylated | 20.78% | (Ohaus MB27) | |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

We claim:

1. A method for producing a sophorolipid composition with an HLB of 9 or greater, the method comprising:
    obtaining a yeast fermentation product comprising a mixture of hydrophilic SLP molecules comprising non-acetylated linear SLP, and hydrophobic SLP molecules comprising lactonic SLP and mono-and di-acetylated linear SLP, said mixture being produced by cultivating a SLP-producing microorganism;
    functionalizing the hydrophobic SLP molecules by converting them into hydrophilic molecules to produce a hydrophilic SLP fraction comprising only hydrophilic SLP molecules, wherein the hydrophobic SLP molecules are converted to hydrophilic SLP molecules by mixing the hydrophobic SLP molecules with a base;
    producing a purified hydrophobic SLP fraction; and
    mixing the hydrophilic SLP fraction with the purified hydrophobic SLP fraction at a ratio of hydrophilic SLP molecules to purified hydrophobic SLP molecules between 60:40 to 75:25.

2. The method of claim 1, wherein producing the purified hydrophobic SLP fraction comprises allowing a second yeast fermentation product to sit undisturbed for 12 to 24 hours, wherein a layer substantially comprising hydrophobic SLP molecules settles to the bottom of the second yeast fermentation product,
    wherein the settled layer is harvested to obtain a crude hydrophobic SLP fraction comprising residual yeast cells, glucose, fatty acids, and/or fermentation broth, in addition to the hydrophobic SLP molecules, and
    the crude hydrophobic SLP fraction is treated to remove the residual yeast cells, glucose, fatty acids, and/or fermentation broth, thereby producing the purified hydrophobic SLP fraction.

3. The method of claim 1, wherein the SLP-producing microorganism is *Starmerella bombicola*.

4. The method of claim 1, wherein converting the hydrophobic SLP molecules into hydrophilic SLP molecules modifies a functional property of the sophorolipid composition selected from HLB, solubility, foaming, detergency, emulsification, demulsification, and wettability alteration.

5. The method of claim 4, wherein the functional property is HLB.

6. The method of claim 4, wherein the functional property is water solubility, and wherein the water solubility is increased.

7. The method of claim 1, wherein the base facilitates alkali-mediated l actone bond breakage of lactonic SLP molecules and/or alkali-mediated deacetylation of lactonic and/or linear SLP molecules.

8. The method of claim 4, wherein the water solubility of the hydrophobic SLP fraction is increased by mixing the fraction with an organic amine selected from ethanolamine, triethanolamine, propylamine, and isopropylamine.

* * * * *